(12) United States Patent
Chen

(10) Patent No.: US 10,594,209 B2
(45) Date of Patent: Mar. 17, 2020

(54) SWITCHING POWER CONVERTER CIRCUIT AND CONTROL CIRCUIT THEREOF

(71) Applicant: RICHTEK TECHNOLOGY CORPORATION, Zhubei, Hsinchu (TW)

(72) Inventor: Hsuan-Ju Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/171,397

(22) Filed: Oct. 26, 2018

(65) Prior Publication Data

US 2019/0229612 A1   Jul. 25, 2019

Related U.S. Application Data

(60) Provisional application No. 62/622,007, filed on Jan. 25, 2018.

(30) Foreign Application Priority Data

Aug. 31, 2018   (CN) ............................ 2018 1 1010829

(51) Int. Cl.
    *H02M 3/158*  (2006.01)
    *H02M 1/00*   (2006.01)
    *H02M 3/04*   (2006.01)

(52) U.S. Cl.
    CPC ............. *H02M 3/04* (2013.01); *H02M 3/158* (2013.01); *H02M 2001/0003* (2013.01); *H02M 2001/0025* (2013.01)

(58) Field of Classification Search
    CPC .... H02M 3/158; H02M 3/1588; H02M 3/156; H02M 2001/0025; H02M 1/14; H02M 1/143; H02M 2003/1566; H02M 1/00; H02M 3/04; H02M 2001/0003; Y02B 70/1466
    See application file for complete search history.

(56) References Cited

U.S. PATENT DOCUMENTS

| | | | |
|---|---|---|---|
| 8,278,903 B1 * | 10/2012 | Guo | H02M 3/1588 323/288 |
| 2010/0148740 A1 * | 6/2010 | Saitoh | H02M 3/1582 323/283 |

(Continued)

*Primary Examiner* — Gustavo A Rosario-Benitez
(74) *Attorney, Agent, or Firm* — Tung & Associates

(57) ABSTRACT

A switching power converter circuit includes a power switch for operating an inductor to convert the input voltage to the output voltage to drive a load circuit; and a control circuit, including: a pulse width modulation circuit comparing an output related signal with a ramp signal to generate a pulse width modulation signal for controlling the power switch, wherein the output related signal is related to the output voltage; an error amplifier circuit generating an error amplified signal according to a difference between the output related signal and a reference signal; and a ramp signal generation circuit generating the ramp signal, wherein an amplitude of the ramp signal is determined according to the input voltage and the output voltage; and/or the slope of the ramp signal is determined according to the error amplified signal.

28 Claims, 10 Drawing Sheets

(56) References Cited

U.S. PATENT DOCUMENTS

| | | | |
|---|---|---|---|
| 2011/0031951 A1* | 2/2011 | Chen | H02M 3/1582 323/288 |
| 2012/0105030 A1* | 5/2012 | Chen | H02M 3/156 323/271 |
| 2012/0112721 A1* | 5/2012 | Wu | H02M 3/156 323/288 |
| 2012/0250367 A1* | 10/2012 | Desimone | H02M 1/44 363/21.17 |
| 2013/0300392 A1* | 11/2013 | Laur | H02M 3/156 323/284 |
| 2014/0084882 A1* | 3/2014 | Namekawa | G05F 1/46 323/271 |
| 2015/0067358 A1* | 3/2015 | Philbrick | H02M 3/158 713/300 |
| 2015/0162834 A1* | 6/2015 | Llewellyn | H02M 3/158 323/271 |
| 2015/0256078 A1* | 9/2015 | Tanabe | H02M 3/1582 323/271 |
| 2016/0301307 A1* | 10/2016 | Huang | H02M 3/156 |
| 2017/0019030 A1* | 1/2017 | Sugawara | H02M 1/4225 |
| 2018/0050603 A1* | 2/2018 | Hand, III | B60L 58/13 |
| 2018/0269787 A1* | 9/2018 | Chen | H02M 3/156 |
| 2018/0337605 A1* | 11/2018 | Luo | H02M 3/1584 |

* cited by examiner

SWITCHING POWER CONVERTER CIRCUIT AND CONTROL CIRCUIT THEREOF

CROSS REFERENCE

The present invention claims priority to U.S. 62/622,007, filed on Jan. 25, 2018, and CN 201811010829.4, filed on Aug. 31, 2018.

BACKGROUND OF THE INVENTION

Field of Invention

The present invention relates to a switching power converter circuit; particularly, it relates to a switching power converter circuit with high precision and fast response. The present invention also relates to a control circuit for use in the switching power converter circuit.

Description of Related Art

FIG. 1 shows a prior art constant ON-time switching power converter circuit (COT switching power converter circuit 1). In general, a constant ON-time switching power converter circuit is advantageous in simple control scheme and fast load response; however, in order to reduce the product size, its output capacitor Co often employs a ceramic capacitor, and under such circumstance, the parasitic resistance Rco is usually very small to cause the constant ON-time switching power converter circuit to be less stable in operation. In addition, there is a larger error between the average of the output voltage Vout and the regulation target SREF.

In order to solve the above-mentioned problem, many control schemes for constant ON-time switching power converter circuit have been proposed, such as "CMCOT", "V²COT", "DCAP3", and "Rapid Robust Ripple Regulator (R4)". Most of these prior arts employ a high gain error amplifier to increase the precision of the output voltage, and an additional ramp circuit to increase the loop stability. However in return, these prior arts sacrifice the advantage of fast load response of a constant ON-time switching power converter circuit.

Compared to the prior art in FIG. 1, the present invention improves the output voltage precision, and compared to the other prior arts mentioned above, the present invention still keeps the advantage of fast load response.

SUMMARY OF THE INVENTION

From one perspective, the present invention provides a switching power converter circuit, comprising: an inductor; a power switch, configured to operably switch connections of the inductor with an input voltage and an output voltage so as to convert the input voltage to the output voltage to drive a load circuit; and a control circuit, including: a pulse width modulation circuit, configured to operably compare an output related signal with a ramp signal to generate a pulse width modulation signal for controlling the power switch, wherein the output related signal is related to the output voltage; and a ramp signal generation circuit, configured to operably generate the ramp signal, wherein the ramp signal is generated by one or more of the following ways: (1) that the ramp signal generation circuit determines an amplitude of the ramp signal according to the input voltage and the output voltage; and/or (2) that the control circuit further includes an error amplifier circuit configured to operably generate an error amplified signal according to a difference between a signal to be regulated in the switching power converter circuit and a reference signal, and the ramp signal generation circuit determines a first slope of the ramp signal according to the error amplified signal.

In one embodiment, the first slope is a slope of an ascending ramp portion or a descending ramp portion of the ramp signal.

In one embodiment, the ramp signal generation circuit adjusts a slope of the descending ramp portion when the first slope is a slope of the ascending ramp portion or adjusts a slope of the ascending ramp portion when the first slope is a slope of the descending ramp portion according to the input voltage and the output voltage, to determine the amplitude of the ramp signal.

In one embodiment, the ramp signal generation circuit determines the amplitude of the ramp signal further according to a duty ratio of the pulse width modulation signal.

In one embodiment, the pulse width modulation circuit includes: a comparison circuit, configured to operably compare the output related signal with the ramp signal to generate a comparison output signal; and a constant time generation circuit, configured to operably generate a constant time signal according to the comparison output signal, the constant time signal defining a constant ON-time for controlling the power switch to be ON for a constant duty period which is substantially equal to the constant ON-time in each cycle period.

In one embodiment, the amplitude is related to a sum of N1 fold of the input voltage and N2 fold of the output voltage.

In one embodiment, the ratio of N2:N1 is larger than 1.

In one embodiment, the ratio of N2:N1 is substantially equal to 2.

In one embodiment, the ramp signal generation circuit includes: a first slope control circuit, configured to operably generate a slope adjustment current according to the error amplified signal; an amplitude control circuit, configured to operably generate an amplitude adjustment current according to the input voltage and the output voltage; and an integration capacitor coupled to the first slope control circuit and the amplitude control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, while the other of the ascending ramp portion and the descending ramp portion is generated according to the amplitude adjustment current to have the amplitude and the amplitude is determined according to the amplitude adjustment current in a corresponding other one of the ascending period and the descending period of the ramp signal.

In one embodiment, the ramp signal generation circuit includes: a first slope control circuit, configured to operably generate a slope adjustment current according to the error amplified signal; a sample-and-hold circuit, configured to operably sample and hold the ramp signal; a voltage-control voltage source, configured to operably generate a bias voltage according to the input voltage and the output voltage; and an integration capacitor coupled to the first slope control circuit and the voltage-control voltage source to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, and at the end of said ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

In one embodiment, the descending ramp portion has a duration which substantially coincides with the ON-time of the pulse width modulation signal.

In one embodiment, the signal to be regulated in the switching power converter circuit is (1) a feedback related signal or (2) the ramp signal.

In one embodiment, the feedback related signal is (1) the output related signal; (2) another signal related to the output voltage; or (3) a signal related to the output current.

In one embodiment, the ramp signal generation circuit includes: a first slope control circuit, configured to operably generate a slope adjustment current according to the error amplified signal; and an integration capacitor coupled to the first slope control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal.

In one embodiment, the ramp signal generation circuit includes: an amplitude control circuit, configured to operably generate an amplitude adjustment current according to the input voltage and the output voltage; and an integration capacitor coupled to the amplitude control circuit to generate the ramp signal, wherein one of the ascending ramp portion and the descending ramp portion is generated according to the amplitude adjustment current have the amplitude and the amplitude is determined according to the amplitude adjustment current in a corresponding ascending period or descending period of the ramp signal.

In one embodiment, the ramp signal generation circuit includes: a sample-and-hold circuit, configured to operably sample and hold the ramp signal; a voltage-control voltage source, configured to operably generate a bias voltage according to the input voltage and the output voltage; and an integration capacitor coupled to the voltage-control voltage source to generate the ramp signal, wherein the ascending ramp portion of the ramp signal corresponds to an ascending period and the descending ramp portion of the ramp signal corresponds to a descending period, and at the end of the ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

From another perspective, the present invention provides a converter control circuit for controlling a switching power converter circuit, the switching power converter circuit including: an inductor; and a power switch, configured to operably switch connections of the inductor with an input voltage and an output voltage so as to convert the input voltage to the output voltage to drive a load circuit; the converter control circuit comprising: a pulse width modulation circuit, configured to operably compare an output related signal with a ramp signal to generate a pulse width modulation signal for controlling the power switch, wherein the output related signal is related to the output voltage; and a ramp signal generation circuit, configured to operably generate the ramp signal, wherein the ramp signal is generated by one or more of the following ways: (1) that the ramp signal generation circuit determines an amplitude of the ramp signal according to the input voltage and the output voltage; and/or (2) that the control circuit further includes an error amplifier circuit configured to operably generate an error amplified signal according to a difference between a signal to be regulated in the switching power converter circuit and a reference signal, and the ramp signal generation circuit determines a first slope of the ramp signal according to the error amplified signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
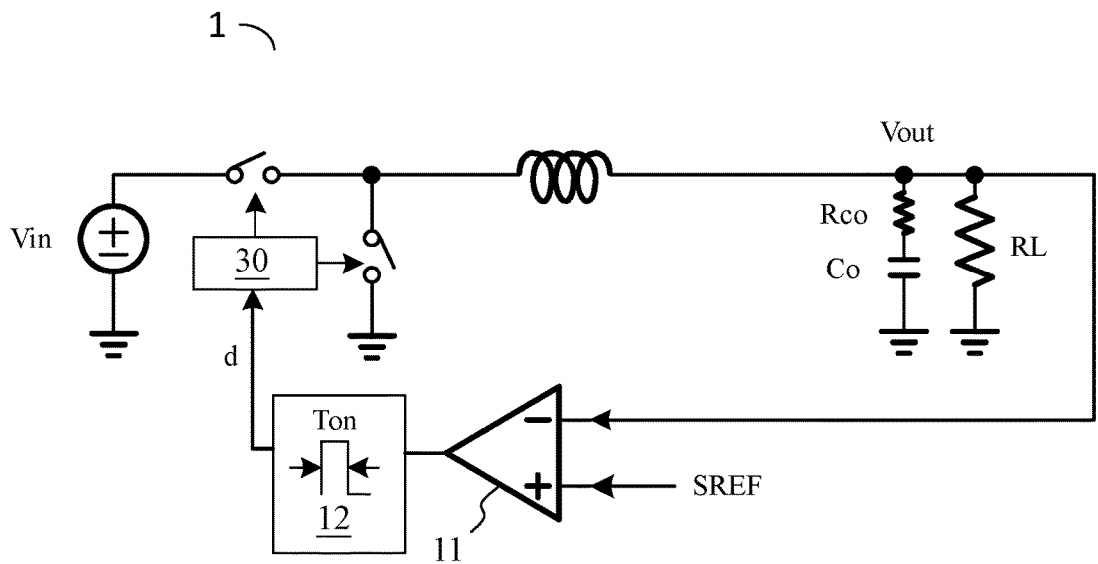
FIG. 1 shows a schematic diagram of a prior art switching power converter circuit.
Figure 2:
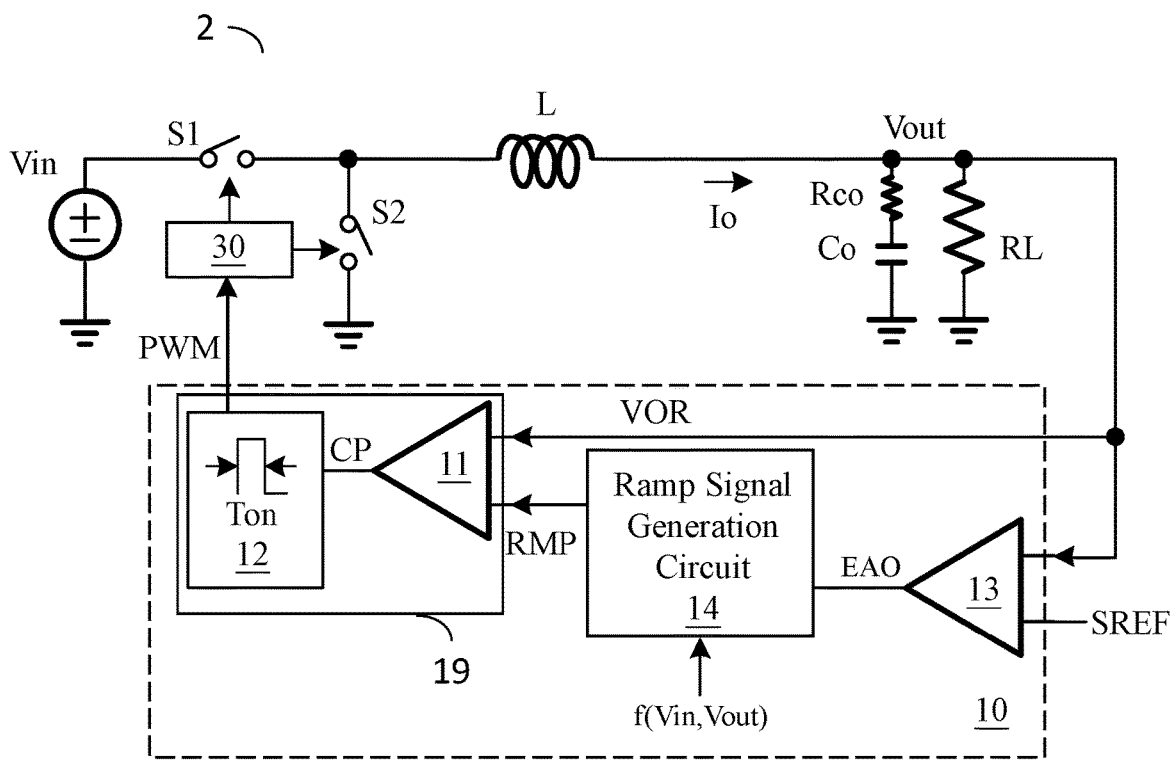
FIG. 2 shows a schematic diagram of embodiments of a switching power converter circuit and a control circuit thereof according to the present invention.

FIG. 2 shows a switching power converter circuit according to an embodiment of the present invention (switching power converter circuit 2). The switching power converter circuit 2 includes an inductor L, at least one power switch (e.g. S1 and S2 in the shown example) and a control circuit 10. The power switches S1 and S2 control the inductor L by switching its connections with the input voltage Vin and the output voltage Vout, so as to convert the input voltage Vin to the output voltage Vout to drive a load circuit (e.g. RL).

Still referring to FIG. 2, the control circuit 10 includes a pulse width modulation circuit 19, an error amplifier circuit 13 and a ramp signal generation circuit 14. The pulse width modulation circuit 19 is configured to operably compare an output related signal VOR with a ramp signal RMP to generate a pulse width modulation signal PWM for controlling the power switches S1 and S2, wherein the output related signal VOR relates to the output voltage Vout. In embodiments applying constant time control scheme (such as but not limited to constant ON-time control), the pulse width modulation circuit 19 includes a comparison circuit 11 and a constant time signal generation circuit 12. In one embodiment, as shown in the figure, the output related signal VOR is directly coupled to the output voltage Vout. In another embodiment, the output related signal VOR for example may be a divided voltage of the output voltage Vout. The comparison circuit 11 is configured to operably compare the output related signal VOR with the ramp signal RMP to generate a comparison output signal CP. The constant time signal generation circuit 12 is configured to operably generate a constant time signal according to the comparison output signal CP, for controlling the power switches. The constant time signal for example may be a constant ON-time signal in one embodiment, or a constant OFF-time signal in another embodiment, to control the power switches S1 and S2 accordingly. In this embodiment, the constant time signal generated by the constant time signal generation circuit 12 defines a constant ON-time Ton, for controlling the power switch S1 to be ON for a constant duty period which is substantially equal to the constant ON-time Ton in each cycle period. The error amplifier circuit 13 is configured to operably generate an error amplified signal EAO according to a difference between the output related signal VOR and a reference signal SREF. In one embodiment, the gain of the error amplifier circuit 13 is higher than a predetermined gain threshold (for example but not limited to 80 dB), such that the difference between the average of the output voltage Vout and its target (corresponding to the reference signal SREF) is smaller than a predetermined error range, so as to improve the precision of generating the output voltage Vout. The ramp signal generation circuit 14 is configured to operably generate the ramp signal RMP according to the error amplified signal EAO, the input voltage Vin and the output voltage Vout; in this embodiment, the ramp signal generation circuit 14 determines an amplitude Vpp of the ramp signal RMP according to the input voltage Vin and the output voltage Vout, and determines a first slope SLP1 according to the error amplified signal EAO.

In one embodiment, the switching power converter circuit according to the present invention (e.g. the switching power converter circuit 2) further includes a switch signal generation circuit 30 for generating switch control signals according to the pulse width modulation signal PWM, to control the power switches S1 and S2. The switch signal generation circuit 30 for example includes a logic circuit which converts the pulse width modulation signal PWM to the switch control signals to control the power switches S1 and S2, and a driver circuit for driving the power switches S1 and S2.

Note that the "constant time" (such as "constant ON-time" or "constant OFF-time") means that when the switching power converter circuit is operating in a stable state and the external conditions maintain the same, the "constant time" has a constant duration. However, this does not mean that when the external conditions change, the "constant time" still has to be the same. Under different application conditions, the "constant time" can be adaptively adjusted or set. For example, in applications which prefer the operation frequencies to be stable, the duration of the "constant time" can be adaptively adjusted according to different input voltages and output voltages. For another example, in applications which prefer better line voltage transient response or load transient response, the duration of the "constant time" can be adaptively adjusted according to different output voltages and output currents. In other words, the "constant time" can be different if the external conditions are different, and the term "constant time" means that its duration is substantially a constant when the external conditions are the same, but does not mean that the duration of the "constant time" is necessarily the same when the external conditions are different.

Also note that the present invention is not limited to generating the pulse width modulation signal PWM having a constant time (such as a constant ON-time). In another embodiment, the pulse width modulation circuit 19 can generate a pulse width modulation signal PWM having an ON-time which is dynamically adjusted. In some embodiments, the switching power converter circuit of the present invention may be a constant frequency or variable frequency voltage mode or current mode switching power converter circuit; in these embodiments, the pulse width modulation circuit 19 can include a corresponding modulation circuit for generating the pulse width modulation signal PWM having a dynamically adjusted ON-time.

Figure 3:
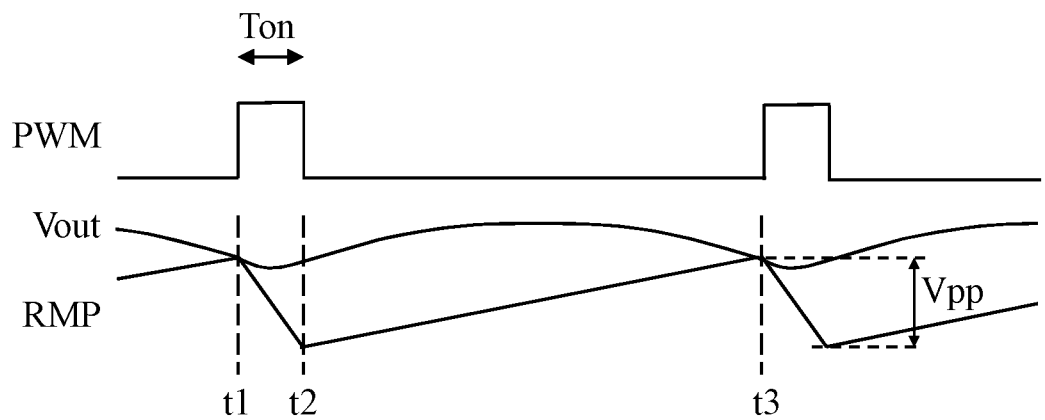
FIG. 3 shows signal waveforms corresponding to the embodiments of the present invention.

FIG. 3 shows signal waveforms corresponding to the embodiments of the present invention. In this embodiment, the switch control signal for the power switch S1 for example can be in phase with the pulse width modulation signal PWM, i.e., the power switch S1 is ON in the ON-time Ton. In one embodiment, the first slope SLP1 is the slope of either the ascending ramp portion or the descending ramp portion of the ramp signal RMP. Taking FIG. 3 for example, the ascending ramp portion of the ramp signal RMP (e.g., t2-t3) has the first slope SLP1, which is determined by the error amplified signal EAO.

In one embodiment, the ramp signal generation circuit 14 adjusts the slope of the other portion of the ramp signal RMP (i.e., adjusts the descending ramp portion of the ramp signal RMP if the ascending ramp portion has the first slope SLP1, or adjusts the ascending ramp portion of the ramp signal RMP if the descending ramp portion has the first slope SLP1), to determine the amplitude Vpp. Taking FIG. 3 for example, the ramp signal generation circuit 14 adjusts the slope of the descending ramp portion of the ramp signal RMP (e.g., t1-t2) according to the input voltage Vin and the output voltage Vout, to determine the amplitude Vpp. In this embodiment, the descending ramp portion occurs in the ON-time Ton (which is for example but not limited to a constant ON-time), i.e., the descending ramp portion of the ramp signal RMP has a duration (i.e. t1-t2) which substantially coincides with the ON-time Ton.

However, due to parasitic effects of the circuit components (which may cause delay) or imperfect matching among the circuit components, although it is intended for the duration of the descending ramp portion of the ramp signal RMP to exactly coincide with the ON-time Ton, practically, there might be a certain tolerable error, and therefore it is described that the descending ramp portion of the ramp signal RMP has a duration which "substantially" coincides with the ON-time Ton. In the context of the present invention, the term "substantially" means that a certain tolerable error is allowed.

Figure 4:
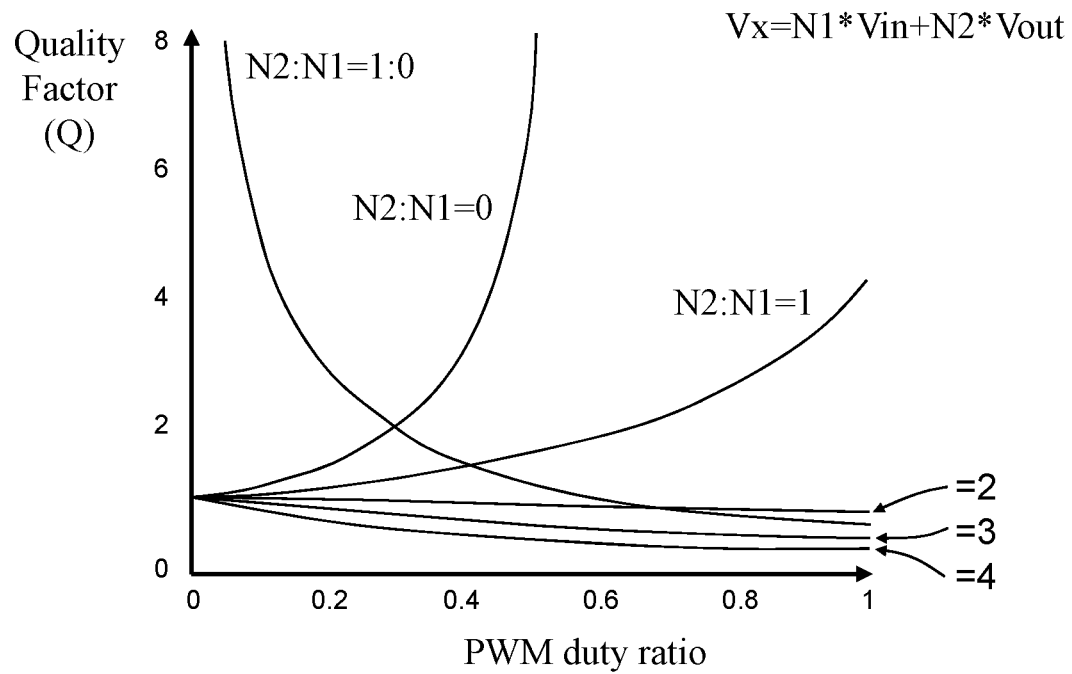
FIG. 4 shows a characteristic curve of the quality factor of the switching power converter circuit according to the present invention.

FIG. 4 shows a characteristic curve of the quality factor (Q) of the switching power converter circuit according to the present invention. In one embodiment, the amplitude Vpp can be determined according to a sum of N1 fold of input voltage and N2 fold of output voltage (N1*Vin+N2*Vout). As shown in FIG. 4, when the ratio of N2:N1 is larger than 1, the switching power converter circuit according to the present invention has a better quality factor (Q). In other words, in a preferred embodiment, the ratio of N2:N1 is larger than 1, whereby even if the parasitic resistance Rco of the output capacitor Co is small, the switching power converter circuit can still operate stably. In a preferred embodiment, the ratio of N2:N1 is substantially equal to 2, and as shown in the figure, the quality factor (Q) is substantially unchanged (kept low) under variation of the PWM duty ratio d (0~1), and the switching power converter circuit has a better performance on transient response.

Figure 5:
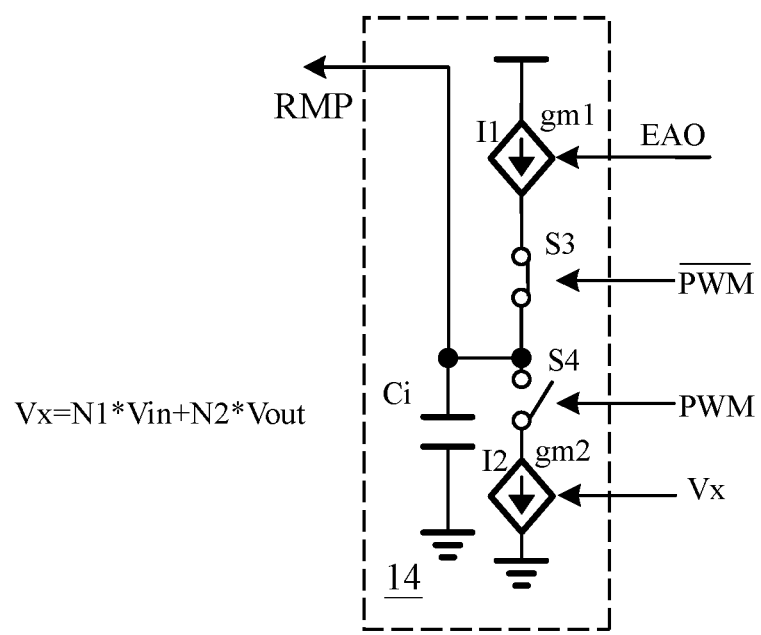
FIG. 5 shows a schematic diagram of a specific embodiment of a ramp signal generation circuit according to the present invention.

FIG. 5 shows a schematic diagram of a specific embodiment of a ramp signal generation circuit according to the present invention (ramp signal generation circuit 14). In this embodiment, the ramp signal generation circuit 14 includes a first slope control circuit gm1, an amplitude control circuit gm2, and an integration capacitor Ci. The first slope control circuit gm1 is configured to operably generate a slope adjustment current I1 according to the error amplified signal EAO. In one embodiment, the first slope control circuit gm1 can be a voltage-control current source. The amplitude control circuit gm2 is configured to operably generate an amplitude adjustment current I2 according to the input voltage Vin and the output voltage Vout. In one embodiment, the amplitude adjustment current I2 can be a voltage-control current source. The integration capacitor Ci is coupled to the first slope control circuit gm1 and the amplitude control circuit gm2 to generate the ramp signal RMP, wherein one of the ascending ramp portion and the descending ramp portion of the ramp signal RMP is generated according to the slope adjustment current I1 to have the first slope SLP1 and the first slope SLP1 is determined according to the slope adjustment current I1 in a corresponding ascending or descending period of the ramp signal RMP, while the other of the ascending ramp portion and the descending ramp portion of the ramp signal RMP is generated according to the amplitude adjustment current I2 to have the amplitude Vpp and the amplitude Vpp is determined according to the amplitude adjustment current I2 in a corresponding other one of the ascending period and the descending period of the ramp signal RMP. Referring to FIGS. 3 and 5, in this embodiment, the integration capacitor Ci receives the slope adjustment current I1 to generate the ascending ramp portion (t2-t3 in FIG. 3) and receives the amplitude adjustment current I2 to generate the descending ramp portion (t1-t2 in FIG. 3). More specifically, the amplitude adjustment current I2 is equal to g2*(N1*Vin+N2*Vout), wherein g2 is the transconductance of the amplitude control circuit gm2. In this embodiment, the switches S3 and S4 control the integration capacitor Ci to be charged and discharged by the first slope control circuit gm1 and the amplitude control circuit gm2, so as to generate the ramp signal RMP.

Figure 6:
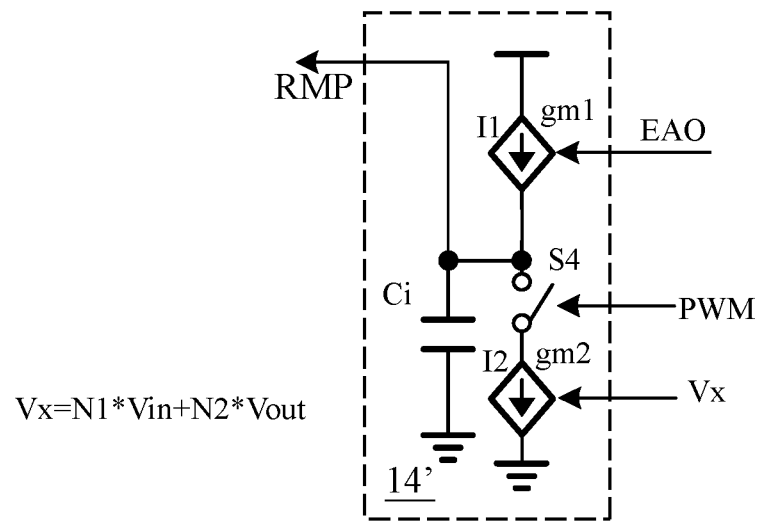
FIG. 6 shows a schematic diagram of another specific embodiment of a ramp signal generation circuit according to the present invention.

FIG. 6 shows a schematic diagram of another specific embodiment of a ramp signal generation circuit according to the present invention (ramp signal generation circuit 14'). The ramp signal generation circuit 14' of this embodiment is different from the ramp signal generation circuit 14 in FIG. 5 in that the switch S3 in the current path connected to the first slope control circuit gm1 is omitted, to avoid surges that might occur at an inflection point when the ramp signal RMP turns its direction, for better stability when the switching power converter circuit operates in DCM (discontinuous conduction mode).

Figure 7:
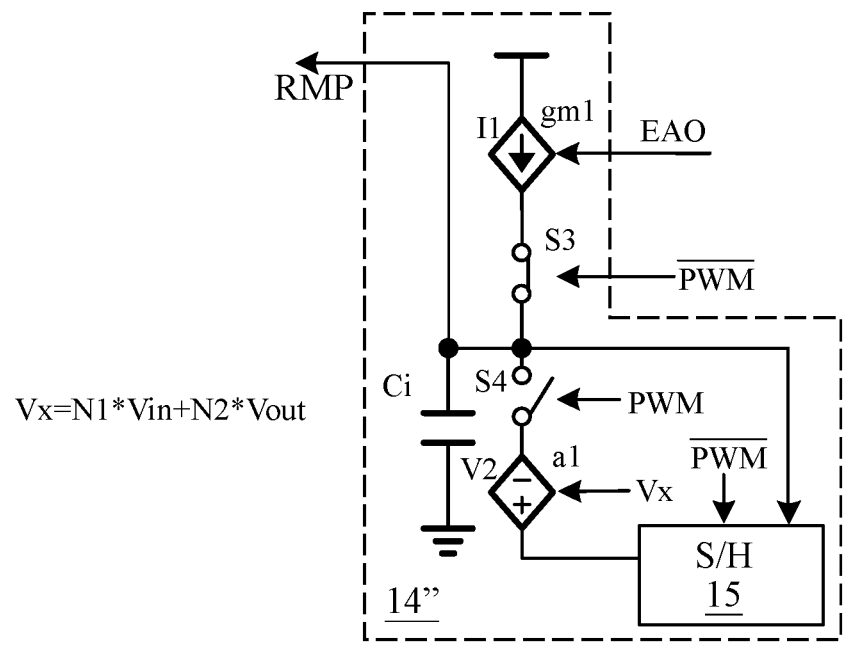
FIG. 7 shows a schematic diagram of another specific embodiment of a ramp signal generation circuit according to the present invention.

FIG. 7 shows a schematic diagram of another specific embodiment of a ramp signal generation circuit according to the present invention (ramp signal generation circuit 14"). The ramp signal generation circuit 14" includes a first slope control circuit gm1, a sample-and-hold circuit 15, a voltage-control voltage source a1 and an integration capacitor Ci. The first slope control circuit gm1 is configured to operably generate a slope adjustment current I1 according to the error amplified signal EAO. The sample-and-hold circuit 15 is configured to sample and hold the ramp signal RMP to generate a sample-and-hold output signal VSH. The voltage-control voltage source a1 is configured to operably generate a bias voltage V2, which is added on the sample-and-hold output signal VSH. One of the ascending ramp portion and the descending ramp portion of the ramp signal RMP is generated according to the slope adjustment current I1 to have the first slope SLP1 and the first slope SLP1 is determined according to the slope adjustment current I1 in a corresponding ascending or descending period of the ramp signal RMP, and at the end of the above-mentioned ascending or descending period, the ramp signal RMP is sampled and held to generate the sample-and-hold output signal VSH, while in the other one of the ascending period and the descending period, the ramp signal RMP is set to the sum of the bias voltage V2 and the sample-and-hold output signal VSH. In one embodiment, the bias voltage V2 corresponding to the amplitude of the ramp signal RMP, and in a preferred embodiment, the bias voltage V2 is substantially equal to the amplitude of the ramp signal RMP.

Figure 8A:
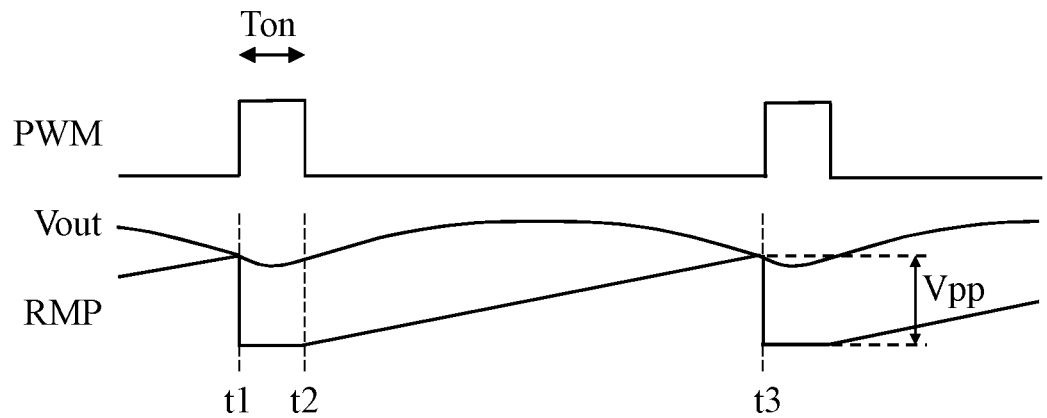
FIGS. 8A and 8B show signal waveforms corresponding to the embodiment of FIG. 7.
Figure 8B:
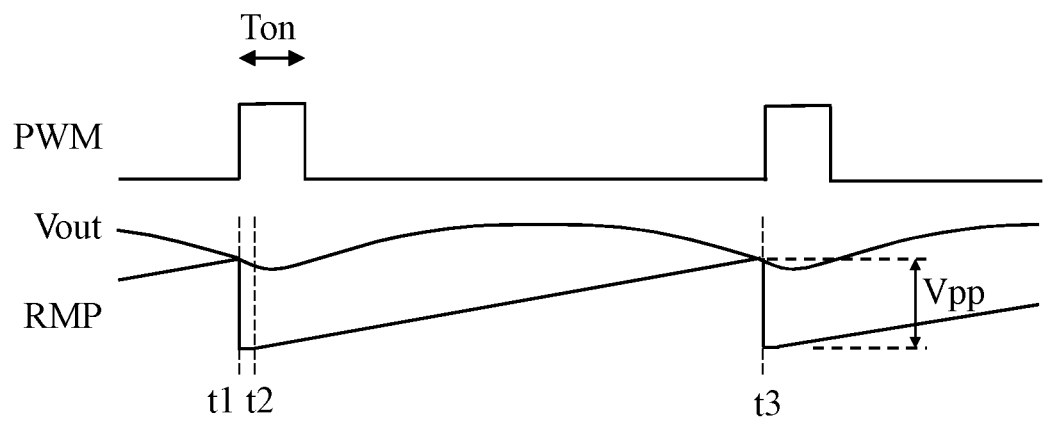

FIGS. 8A and 8B show signal waveforms corresponding to the embodiment of FIG. 7. In detail, in this embodiment, the integration capacitor Ci receives the slope adjustment current I1 to generate the ascending ramp portion (t2-t3 in FIGS. 8A and 8B) in the ascending period and the ramp signal RMP is set to the sum of the bias voltage V2 and the sample-and-hold output signal VSH in the descending period (t1-t2 in FIGS. 8A and 8B). In one embodiment, the descending period t1-t2 can coincide with the constant ON-time Ton (FIG. 8A), while in another embodiment, the descending period t1-t2 can be irrelevant with the constant ON-time Ton (FIG. 8B, wherein the descending period t1-t2 is for example a very short period). In a specific embodiment, the bias voltage V2 is equal to k*(N1*Vin+N2*Vout), wherein k is the voltage ratio of the voltage-control voltage source a1. In one embodiment, the ramp signal generation circuit (14, 14' or 14") determines the amplitude Vpp further according to the duty ratio d of the pulse width modulation signal PWM.

The present invention is not limited to the aforementioned ways for generating the ramp signal; the ramp signal can be generated in various other ways under the spirit of the present invention. FIGS. 9A-9G show several embodiments of the control circuit according to the present invention (control circuits 10A-10G). The control circuits 10A-10G provide similar functions as the control circuit 10 in FIG. 2, but are slightly different.

Figure 9A:
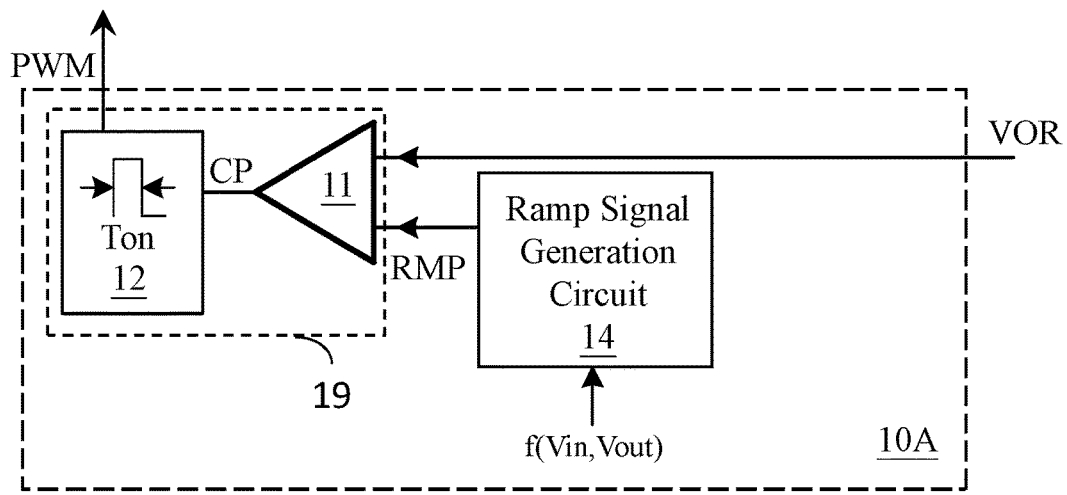
FIGS. 9A-9G show several embodiments of the control circuit according to the present invention.

As shown in FIG. 9A, in one embodiment, the error amplifier circuit 13 can be omitted, and in this case, the ramp signal generation circuit 14 determines the amplitude Vpp of the ramp signal RMP according to the input voltage Vin and the output voltage Vout.

Figure 9B:
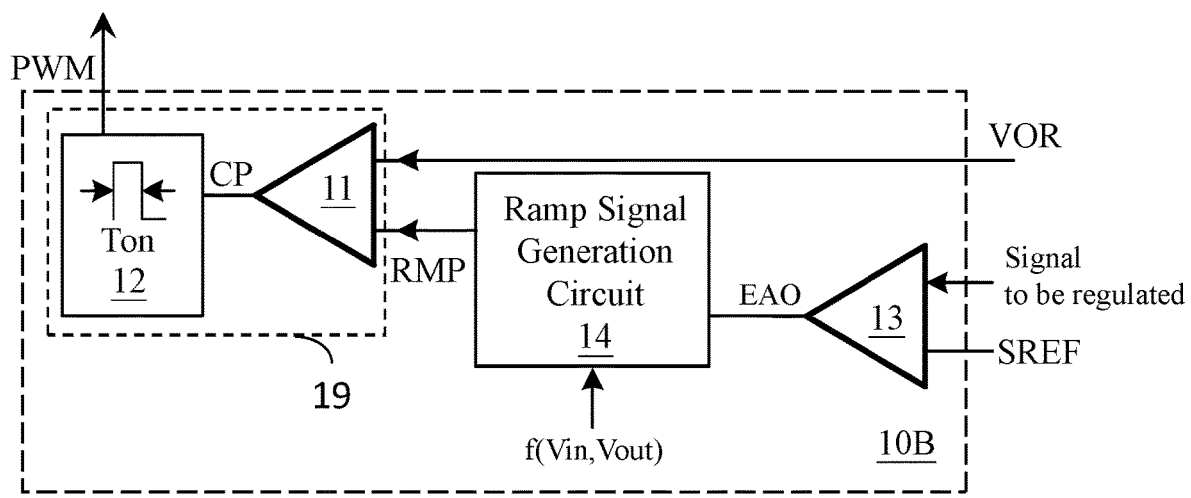
Figure 9C:
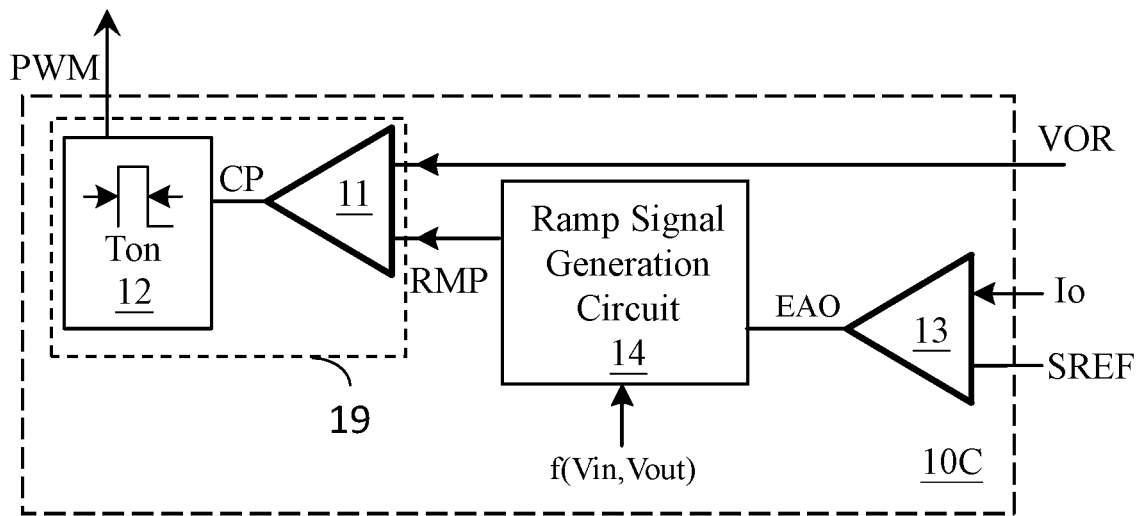

As shown in FIG. 9B, in one embodiment, the error amplifier circuit 13 can generate the error amplified signal EAO according to a difference between any signal to be regulated and the reference SREF. In one embodiment, the signal to be regulated may be a feedback related signal, wherein an example of the feedback related signal is the output related signal VOR, and in other embodiments, the feedback related signal may be a signal related to the output current Io, as shown in FIG. 9C.

Figure 9D:
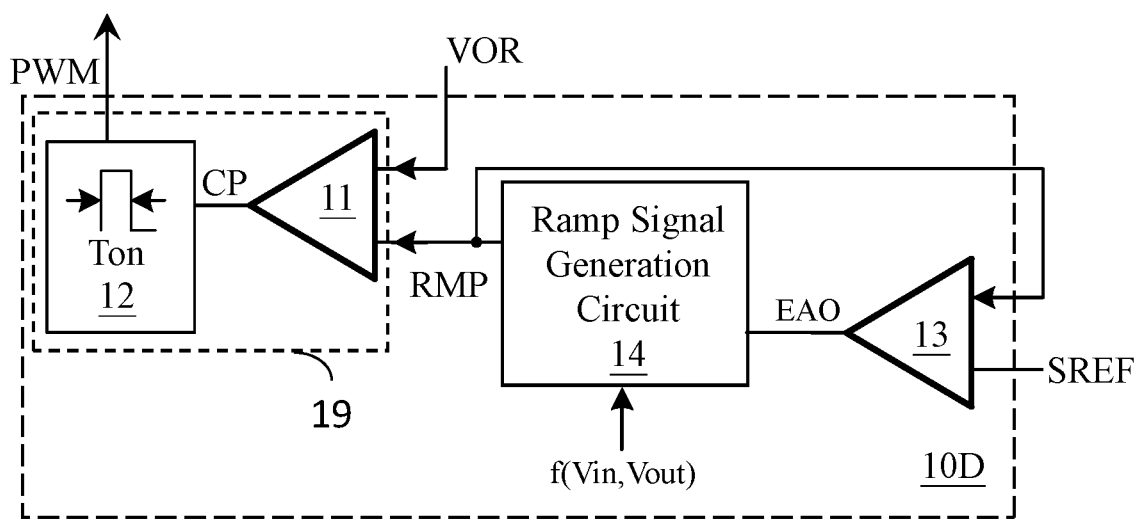

In another embodiment, the signal to be regulated may be the ramp signal RMP, as shown in FIG. 9D.

In one aspect, because the error amplifier circuit 13 has a high gain, the error amplifier circuit 13 can regulate any signal to be regulated so that the signal to be regulated corresponds to (such as, is equal to or close to) the reference signal SREF, by adjusting the feedback loop of the first slope of the ramp signal RMP.

In one embodiment, it is not necessary to "determine an amplitude Vpp of the ramp signal RMP according to the input voltage Vin and the output voltage Vout". The embodiments shown in FIG. 9E-9G correspond to and are similar to the embodiments shown in FIG. 9B-9D, but it does not require "determining an amplitude Vpp of the ramp signal RMP according to the input voltage Vin and the output voltage Vout" in generating the ramp signal RMP.

Figure 10A:
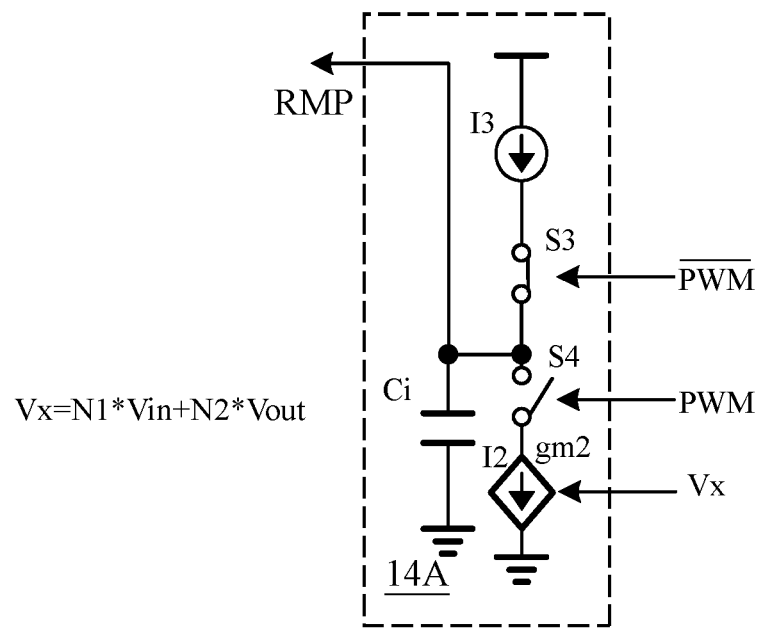
FIGS. 10A-10C show several other embodiments of the ramp signal generation circuit according to the present invention.
Figure 10B:
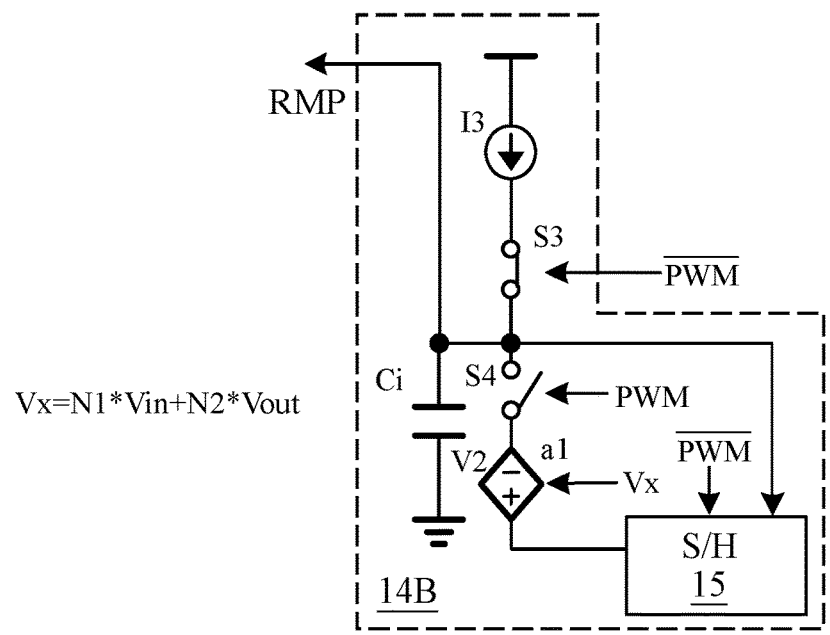
Figure 10C:
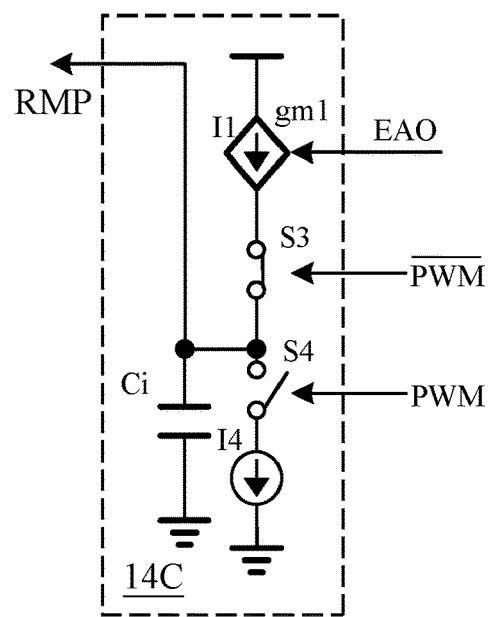

In correspondence with the above, FIGS. 10-10C show several other embodiments of the ramp signal generation circuit according to the present invention.

FIG. 10A for example corresponds to FIG. 9A; as shown in the figure, the ramp signal generation circuit 14A includes an amplitude control circuit g2 and an integration capacitor Ci; the integration capacitor Ci receives a slope current I3 to generate one of the ascending ramp portion and the descending ramp portion of the ramp signal RMP in a corresponding ascending or descending period of the ramp signal RMP, wherein the slope current I3 for example can be a constant current, so that the slope of the ramp signal RMP in this period is a constant, while the other of the ascending ramp portion and the descending ramp portion of the ramp signal RMP is generated according to the amplitude adjustment current I2 to have the amplitude Vpp and the amplitude Vpp is determined according to the amplitude adjustment current I2 in a corresponding other one of the ascending period and the descending period of the ramp signal RMP.

FIG. 10B corresponds to FIG. 9A and is similar to FIG. 7, but is different in that, in this embodiment, in one of the ascending period and descending period of the ramp signal RMP, the integration capacitor Ci receives the slope current I3 to generate a corresponding ascending ramp portion or descending ramp portion of the ramp signal RMP, wherein the slope current I3 for example can be a constant current, so that the slope of the ramp signal RMP in this period is a constant. The amplitude of the ramp signal RMP is controlled by the same manner as FIG. 7 and is not redundantly repeated here.

Figure 9E:
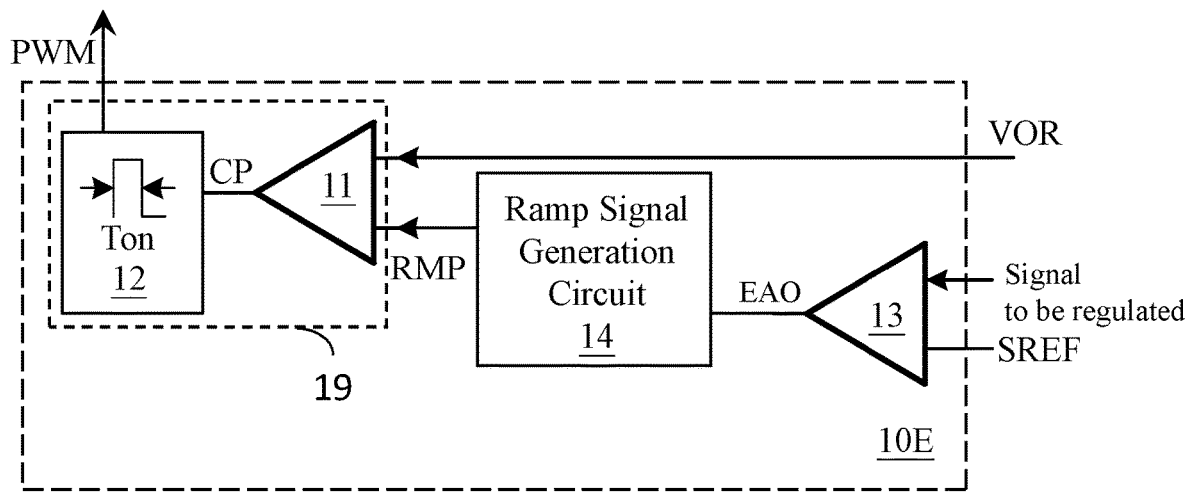
Figure 9F:
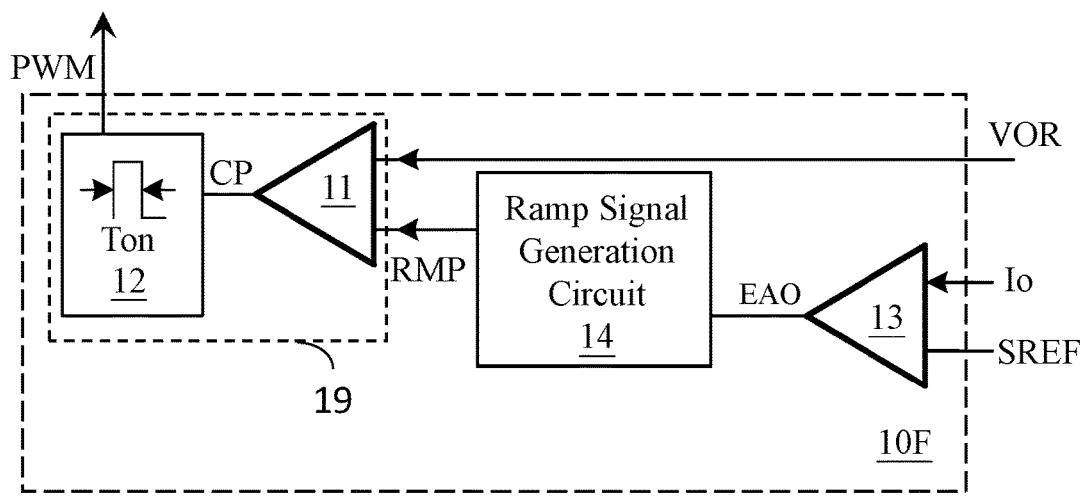
Figure 9G:
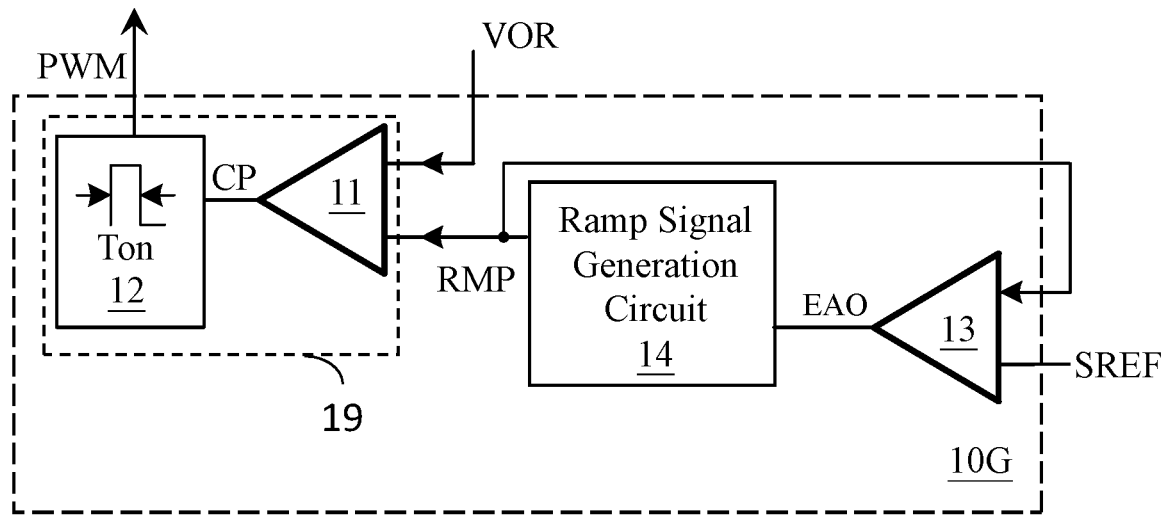

FIG. 10c corresponds to FIGS. 9E-9G and is similar to FIG. 5, but is different in that, in this embodiment, in one of the ascending period and descending period of the ramp signal RMP, the integration capacitor Ci receives an amplitude current I4 to generate a corresponding ascending ramp portion or descending ramp portion of the ramp signal RMP, wherein the amplitude current I4 for example can be a constant current, so that the amplitude of the ramp signal RMP is a constant. The first slope of the ramp signal RMP is controlled by the same manner as FIG. 5 and is not redundantly repeated here.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, a buck switching converter circuit is given as an example in the aforementioned embodiments, but the present invention can be applied to other types of switching converter circuits, such as boost or buck-boost switching converter circuits. For another example, in the aforementioned embodiments, the error amplifier circuit 13 and the comparison circuit 11 both operate according to the same output related signal VOR, but under the same spirit, the error amplifier circuit 13 and the comparison circuit 11 can be coupled to a different form of a output related signal; for example, the error amplifier circuit 13 can receive a divided voltage of the output voltage Vout, while the comparison circuit 11 can be directly connected to the output voltage Vout, or the opposite arrangement. For another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A switching power converter circuit comprising: an inductor; a power switch, configured to operably switch connections of the inductor with an input voltage and an output voltage so as to convert the input voltage to the output voltage to drive a load circuit; and a control circuit, including: a pulse width modulation circuit, configured to operably compare an output related signal with a ramp signal to generate a pulse width modulation signal for controlling the power switch, wherein the output related signal is related to the output voltage; and a ramp signal generation circuit, configured to operably generate the ramp signal, wherein the ramp signal is generated by the following ways: (1) that the ramp signal generation circuit determines an amplitude of the ramp signal according to a sum of Ni fold of the input voltage and N2 fold of the output voltage, wherein Ni and N2 are positive real numbers; and (2) that the control circuit further includes an error amplifier circuit configured to operably generate an error amplified signal according to a difference between a signal to be regulated in the switching power converter circuit and a reference signal, and the ramp signal generation circuit determines a first slope of the ramp signal according to the error amplified signal, wherein the error amplifier regulates the signal to be regulated such that the signal to be regulated is substantially equal to the reference signal or is proportional to the reference signal; wherein, (1) when the ramp signal ramps with a same direction as a current of the inductor, the first slope is a slope of a descending ramp portion of the ramp signal; or (2) when the ramp signal ramps with an opposite direction as the current of the inductor, the first slope is a slope of an ascending ramp portion of the ramp signal.

2. The switching power converter circuit of claim 1, wherein
   (1) when the ramp signal ramps with the same direction as a current of the inductor, the ramp signal generation circuit adjusts a slope of the ascending ramp portion of the ramp signal according to the sum of N1 fold of the input voltage and N2 fold of the output voltage, to determine the amplitude of the ramp signal; or (2) when the ramp signal ramps with the opposite direction as the current of the inductor, the ramp signal generation circuit adjusts the slope of a descending ramp portion of the ramp signal according to the sum of N1 fold of the input voltage and N2 fold of the output voltage to determine the amplitude of the ramp signal.

3. The switching power converter circuit of claim 1, wherein the ramp signal generation circuit determines the amplitude of the ramp signal further according to a duty ratio of the pulse width modulation signal.

4. The switching power converter circuit of claim 1, wherein the pulse width modulation circuit includes:
   a comparison circuit, configured to operably compare the output related signal with the ramp signal to generate a comparison output signal; and
   a constant time generation circuit, configured to operably generate a constant time signal according to the comparison output signal, the constant time signal defining a constant ON-time for controlling the power switch to be ON for a constant duty period which is substantially equal to the constant ON-time in each cycle period.

5. The switching power converter circuit of claim 1, wherein the ratio of N2:N1 is larger than 1.

6. The switching power converter circuit of claim 1, wherein the ratio of N2:N1 is larger than or equal to 2, such that a quality factor of the switching power converter circuit is smaller than a predetermined quality factor threshold when a duty ratio of the pulse width modulation signal is between 0 to 1, wherein the predetermined quality factor threshold is a limited number.

7. The switching power converter circuit of claim 1, wherein the ramp signal generation circuit includes:
   a first slope control circuit, configured to operably generate a slope adjustment current according to the error amplified signal;
   an amplitude control circuit, configured to operably generate an amplitude adjustment current according to the sum of N1 fold of the input voltage and N2 fold of the output voltage; and
   an integration capacitor coupled to the first slope control circuit and the amplitude control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, while the other of the ascending ramp portion and the descending ramp portion is generated according to the amplitude adjustment current to have the amplitude and the amplitude is determined according to the amplitude adjustment current in a corresponding other one of the ascending period and the descending period of the ramp signal.

8. The switching power converter circuit of claim 1, wherein the ramp signal generation circuit includes:
   a first slope control circuit, configured to operably generate a slope adjustment current according to the error amplified signal;
   a sample-and-hold circuit, configured to operably sample and hold the ramp signal;
   a voltage-control voltage source, configured to operably generate a bias voltage according to the sum of N1 fold of the input voltage and N2 fold of the output voltage; and
   an integration capacitor coupled to the first slope control circuit and the voltage-control voltage source to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, and at the end of said ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

9. The switching power converter circuit of claim 1, wherein the descending ramp portion not having the first slope has a duration which substantially coincides with the ON-time of the pulse width modulation signal.

10. The switching power converter circuit of claim 1, wherein the signal to be regulated in the switching power converter circuit is (1) a feedback related signal or (2) the ramp signal.

11. The switching power converter circuit of claim 10, wherein the feedback related signal is (1) the output related signal; (2) another signal related to the output voltage; or (3) a signal related to the output current.

12. The switching power converter circuit of claim 1, wherein the ramp signal generation circuit includes:
   a first slope control circuit, configured to operably generate a slope adjustment current according to the error amplified signal; and
   an integration capacitor coupled to the first slope control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal.

13. The switching power converter circuit of claim 1, wherein the ramp signal generation circuit includes:
   an amplitude control circuit, configured to operably generate an amplitude adjustment current according to the sum of N1 fold of the input voltage and N2 fold of the output voltage; and
   an integration capacitor coupled to the amplitude control circuit to generate the ramp signal, wherein one of the ascending ramp portion and the descending ramp portion is generated according to the amplitude adjustment current have the amplitude and the amplitude is determined according to the amplitude adjustment current in a corresponding ascending period or descending period of the ramp signal.

14. The switching power converter circuit of claim 1, wherein the ramp signal generation circuit includes:
   a sample-and-hold circuit, configured to operably sample and hold the ramp signal;
   a voltage-control voltage source, configured to operably generate a bias voltage according to the sum of N1 fold of the input voltage and N2 fold of the output voltage; and
   an integration capacitor coupled to the voltage-control voltage source to generate the ramp signal, wherein the ascending ramp portion of the ramp signal corresponds to an ascending period and the descending ramp portion of the ramp signal corresponds to a descending period, and at the end of the ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

15. A converter control circuit for controlling a switching power converter circuit, the switching power converter circuit including: an inductor; and a power switch, configured to operably switch connections of the inductor with an input voltage and an output voltage so as to convert the input voltage to the output voltage to drive a load circuit; the converter control circuit comprising: a pulse width modulation circuit, configured to operably compare an output related signal with a ramp signal to generate a pulse width modulation signal for controlling the power switch, wherein the output related signal is related to the output voltage; and a ramp signal generation circuit, configured to operably generate the ramp signal, wherein the ramp signal is generated by the following ways: (1) that the ramp signal generation circuit determines an amplitude of the ramp signal according to a sum of Ni fold of the input voltage and N2 fold of the output voltage, wherein Ni and N2 are positive real numbers; and (2) that the control circuit further includes an error amplifier circuit configured to operably generate an error amplified signal according to a difference between a signal to be regulated in the switching power converter circuit and a reference signal, and the ramp signal generation circuit determines a first slope of the ramp signal according to the error amplified signal, wherein the error amplifier regulates the signal to be regulated such that the signal to be regulated is substantially equal to the reference signal or is proportional to the reference signal; wherein, (1) when the ramp signal ramps with a same direction as a current of the inductor, the first slope is a slope of a descending ramp portion of the ramp signal; or (2) when the ramp signal ramps with an opposite direction as the current of the inductor, the first slope is a slope of an ascending ramp portion of the ramp signal.

16. The converter control circuit of claim 15, wherein
(1) when the ramp signal ramps with the same direction as a current of the inductor, the ramp signal generation circuit adjusts a slope of the ascending ramp portion of the ramp signal according to the sum of N1 fold of the input voltage and N2 fold of the output voltage, to determine the amplitude of the ramp signal; or
(2) when the ramp signal ramps with the opposite direction as the current of the inductor, the ramp signal generation circuit adjusts the slope of a descending ramp portion of the ramp signal according to the sum of N1 fold of the input voltage and N2 fold of the output voltage to determine the amplitude of the ramp signal.

17. The converter control circuit of claim 15, wherein the ramp signal generation circuit determines the amplitude of the ramp signal further according to a duty ratio of the pulse width modulation signal.

18. The converter control circuit of claim 15, wherein the pulse width modulation circuit includes:
a comparison circuit, configured to operably compare the output related signal with the ramp signal to generate a comparison output signal; and
a constant time generation circuit, configured to operably generate a constant time signal according to the comparison output signal, the constant time signal defining a constant ON-time for controlling the power switch to be ON for a constant duty period which is substantially equal to the constant ON-time in each cycle period.

19. The converter control circuit of claim 15, wherein the ratio of N2:N1 is larger than 1.

20. The converter control circuit of claim 15, wherein the ratio of N2:N1 is larger than or equal to 2, such that a quality factor of the switching power converter circuit is smaller than a predetermined quality factor threshold when a duty ratio of the pulse width modulation signal is between 0 to 1, wherein the predetermined quality factor threshold is a limited number.

21. The converter control circuit of claim 15, wherein the ramp signal generation circuit includes:
a first slope control circuit, configured to operably generate a slope adjustment current according to the error amplified signal;
an amplitude control circuit, configured to operably generate an amplitude adjustment current according to the sum of N1 fold of the input voltage and N2 fold of the output voltage; and
an integration capacitor coupled to the first slope control circuit and the amplitude control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, while the other of the ascending ramp portion and the descending ramp portion is generated according to the amplitude adjustment current to have the amplitude and the amplitude is determined according to the amplitude adjustment current in a corresponding other one of the ascending period and the descending period of the ramp signal.

22. The converter control circuit of claim 15, wherein the ramp signal generation circuit includes:
a first slope control circuit, configured to operably generate a slope adjustment current according to the error amplified signal;
a sample-and-hold circuit, configured to operably sample and hold the ramp signal;
a voltage-control voltage source, configured to operably generate a bias voltage according to the sum of N1 fold of the input voltage and N2 fold of the output voltage; and
an integration capacitor coupled to the first slope control circuit and the voltage-control voltage source to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal, and at the end of said ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

23. The converter control circuit of claim 15, wherein the descending ramp portion not having the first slope has a duration which substantially coincides with the ON-time of the pulse width modulation signal.

24. The converter control circuit of claim 15, wherein the signal to be regulated in the switching power converter circuit is (1) a feedback related signal or (2) the ramp signal.

25. The converter control circuit of claim 24, wherein the feedback related signal is (1) the output related signal; (2) another signal related to the output voltage; or (3) a signal related to the output current.

26. The converter control circuit of claim 15, wherein the ramp signal generation circuit includes:
   a first slope control circuit, configured to operably generate a slope adjustment current according to the error amplified signal; and
   an integration capacitor coupled to the first slope control circuit to generate the ramp signal, wherein one of the ascending ramp portion and the descending ramp portion is generated according to the slope adjustment current to have the first slope and the first slope is determined according to the slope adjustment current in a corresponding ascending or descending period of the ramp signal.

27. The converter control circuit of claim 15, wherein the ramp signal generation circuit includes:
   an amplitude control circuit, configured to operably generate an amplitude adjustment current according to the sum of N1 fold of the input voltage and N2 fold of the output voltage; and
   an integration capacitor coupled to the amplitude control circuit to generate the ramp signal, wherein one of the ascending ramp portion and the descending ramp portion is generated according to the amplitude adjustment current have the amplitude and the amplitude is determined according to the amplitude adjustment current in a corresponding ascending period or descending period of the ramp signal.

28. The converter control circuit of claim 15, wherein the ramp signal generation circuit includes:
   a sample-and-hold circuit, configured to operably sample and hold the ramp signal;
   a voltage-control voltage source, configured to operably generate a bias voltage according to the sum of N1 fold of the input voltage and N2 fold of the output voltage; and
   an integration capacitor coupled to the voltage-control voltage source to generate the ramp signal, wherein the ascending ramp portion of the ramp signal corresponds to an ascending period and the descending ramp portion of the ramp signal corresponds to a descending period, and at the end of the ascending or descending period, the ramp signal is sampled and held to generate a sample-and-hold output signal, while in the other one of the ascending period and the descending period, the ramp signal is set to the sum of the bias voltage and the sample-and-hold output signal, wherein the bias voltage corresponds to the amplitude.

* * * * *